United States Patent
Takeda et al.

(10) Patent No.: US 10,425,924 B2
(45) Date of Patent: Sep. 24, 2019

(54) USER TERMINAL, RADIO BASE STATION AND RADIO COMMUNICATION METHOD FOR LIMITED LISTENING

(71) Applicant: NTT DOCOMO, INC., Tokyo (JP)

(72) Inventors: Kazuki Takeda, Tokyo (JP); Hiroki Harada, Tokyo (JP); Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/524,647

(22) PCT Filed: Oct. 9, 2015

(86) PCT No.: PCT/JP2015/078738
§ 371 (c)(1),
(2) Date: May 5, 2017

(87) PCT Pub. No.: WO2016/072214
PCT Pub. Date: May 12, 2016

(65) Prior Publication Data
US 2017/0325215 A1    Nov. 9, 2017

(30) Foreign Application Priority Data
Nov. 6, 2014   (JP) ................................ 2014-225677

(51) Int. Cl.
*H04W 72/04* (2009.01)
*H04J 11/00* (2006.01)
(Continued)

(52) U.S. Cl.
CPC ..... *H04W 72/0413* (2013.01); *H04J 11/0023* (2013.01); *H04W 16/14* (2013.01);
(Continued)

(58) Field of Classification Search
CPC ............ H04W 72/04; H04W 72/0406; H04W 72/0413; H04W 72/044; H04W 72/0453;
(Continued)

(56) References Cited

U.S. PATENT DOCUMENTS

2007/0230394 A1* 10/2007 Wang ................... H04J 11/0069
370/328
2009/0190488 A1* 7/2009 Hochwald ............ H04B 7/0617
370/252
(Continued)

OTHER PUBLICATIONS

International Search Report issued in corresponding application No. PCT/JP2015/078738 dated Jan. 12, 2016 (2 pages).
(Continued)

*Primary Examiner* — Jenee Holland
(74) *Attorney, Agent, or Firm* — Osha Liang LLP

(57) ABSTRACT

The present invention is designed so as to carry out the listening operation that accompanies UL transmission and/or UL transmission adequately when UL transmission is controlled based on the result of listening. The present invention provides a transmission section that transmits an uplink shared channel, an uplink control channel and an uplink reference signal, and a control section that controls the transmission of the uplink shared channel, the uplink control channel and/or the uplink reference signal based on the result of listening in the uplink, and, when the uplink reference signal is configured to be transmitted in a subframe in which the uplink shared channel and/or the uplink control channel are transmitted, the control section controls the transmission of the uplink reference signal based on the result of listening that is executed before the uplink shared channel and/or the uplink control channel are transmitted.

7 Claims, 12 Drawing Sheets

(51) Int. Cl.
*H04W 74/08* (2009.01)
*H04W 16/14* (2009.01)

(52) U.S. Cl.
CPC ....... *H04W 74/08* (2013.01); *H04W 74/0808* (2013.01); *H04W 72/0453* (2013.01)

(58) Field of Classification Search
CPC .. H04W 74/08; H04W 74/0808; H04W 16/14
See application file for complete search history.

(56) References Cited

U.S. PATENT DOCUMENTS

| | | | | |
|---|---|---|---|---|
| 2013/0315152 A1* | 11/2013 | Ratasuk | ............... | H04W 76/14 370/329 |
| 2014/0269459 A1* | 9/2014 | Fan | ...................... | H04W 74/02 370/294 |
| 2015/0131536 A1* | 5/2015 | Kaur | ....................... | H04L 5/001 370/329 |
| 2015/0163739 A1* | 6/2015 | Fan | .................... | H04W 52/0216 370/311 |
| 2015/0222402 A1* | 8/2015 | Ouchi | ....................... | H04L 1/00 370/329 |
| 2015/0236766 A1* | 8/2015 | Papadopoulos | ...... | H04B 7/0452 370/329 |
| 2015/0296486 A1* | 10/2015 | Park | ....................... | H04W 24/02 370/329 |
| 2017/0215172 A1* | 7/2017 | Yang | ........................ | H04B 7/26 |
| 2017/0245302 A1* | 8/2017 | Mukherjee | ............ | H04W 16/14 |

OTHER PUBLICATIONS

Written Opinion of the International Searching Authority issued in corresponding application No. PCT/JP2015/078738 dated Jan. 12, 2016 (3 pages).

3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

* cited by examiner

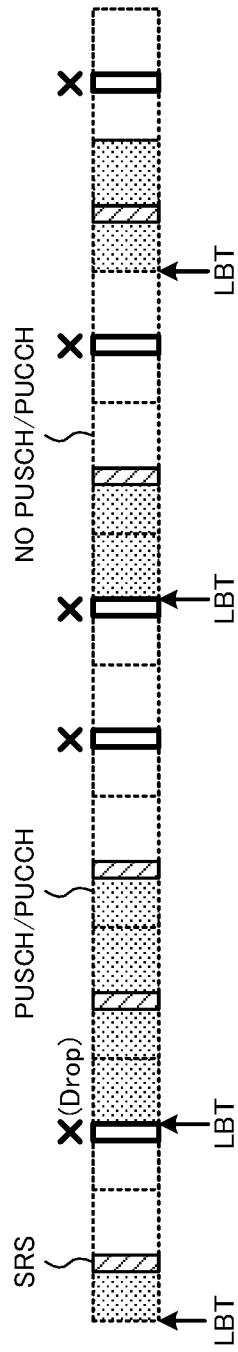
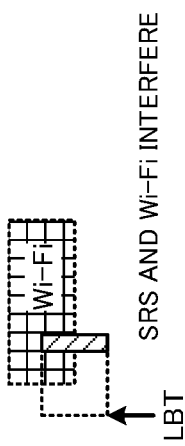
FIG. 5A
FIG. 5B

USER TERMINAL, RADIO BASE STATION AND RADIO COMMUNICATION METHOD FOR LIMITED LISTENING

TECHNICAL FIELD

The present invention relates to a user terminal, a radio base station and a radio communication method that are applicable to next-generation communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (also referred to as, for example, "LTE-advanced" or "LTE enhancement" (hereinafter referred to as "LTE-A")) have been developed for the purpose of achieving further broadbandization and increased speed beyond LTE, and the specifications thereof have been drafted (Re. 10/11).

In relationship to LTE-A systems, a HetNet (Heterogeneous Network), in which small cells (for example, pico cells, femto cells and so on), each having local a coverage area of a radius of approximately several tens of meters, are formed within a macro cell having a wide coverage area of a radius of approximately several kilometers, is under study. Also, in relationship to HetNets, a study is in progress to use carriers of different frequency bands between macro cells (macro base stations) and small cells (small base stations), in addition to carriers of the same frequency band.

Furthermore, for future radio communication systems (Rel. 12 and later versions), a system ("LTE-U" (LTE Unlicensed)) to run LTE systems not only in frequency bands licensed to communications providers (operators) (licensed bands), but also in frequency bands where license is not required (unlicensed bands), is under study. In particular, a system that runs an unlicensed band on the premise that a licensed band is present (LAA: Licensed-Assisted Access) is also under study. Note that systems that run LTE/LTE-A in unlicensed bands may be collectively referred to as "LAA." A licensed band is a band in which a specific provider is allowed exclusive use, and an unlicensed band is a band which is not limited to a specific provider, and in which radio stations can be provided.

For unlicensed bands, for example, the 2.4 GHz band and the 5 GHz band where Wi-Fi (registered trademark) and Bluetooth (registered trademark) can be used, and the 60 GHz band where millimeter-wave radars can be used are under study for use. Studies are in progress to use these unlicensed bands in small cells.

CITATION LIST

Non-Patent Literature

Non-Patent Literature 1: 3GPP TS 36. 300 "Evolved UTRA and Evolved UTRAN Overall Description"

SUMMARY OF INVENTION

Technical Problem

Existing LTE presumes operations in licensed bands, and therefore each operator is allocated a different frequency band. However, unlike a licensed band, an unlicensed band is not limited to use by a specific provider. Furthermore, unlike a licensed band, an unlicensed band is not limited to use in a specific radio system (for example, LTE, Wi-Fi, etc.). Consequently, there is a possibility that the frequency band which a given operator uses in LAA overlaps the frequency band which another operator uses in LAA and/or Wi-Fi.

An unlicensed band may be run without even synchronization, coordination and/or cooperation between different operators and/or non-operators. Furthermore, different operators and/or non-operators may set up radio access points (also referred to as "APs," "TPs," etc.) and/or radio base stations (eNBs) without even coordinating and/or cooperating with each other. In this case, detailed cell planning is not possible, and interference control is not possible, and therefore there is a threat that significant cross-interference is produced in the unlicensed band, unlike a licensed band.

Consequently, when an LTE/LTE-A system (for example, LTE-U) is run in an unlicensed band, it is desirable if the LTE/LTE-A system operates by taking into account the cross-interference with other systems that run in unlicensed bands such as Wi-Fi, other operators' LTE-U, and so on. In order to prevent cross-interference in unlicensed bands, a study is in progress to allow an LTE-U base station/user terminal to perform "listening" before transmitting a signal and check whether other base stations/user terminals are communicating.

In LTE/LTE-A systems, a user terminal transmits control signals (for example, the PUCCH signal), data signals (for example, the PUSCH signal), reference signals (for example, the channel quality measurement reference signal (SRS: Sounding Reference Signal)) and so on in UL. Consequently, when a user terminal controls UL transmission (for example, deciding whether or not transmission is possible) based on the result of listening in the uplink (UL), how to control the listening operation (for example, listening timing) is the problem.

The present invention has been made in view of the above, and it is therefore an object of the present invention to provide a user terminal, a radio base station and a radio communication method, whereby the listening operation that accompanies UL transmission and/or UL transmission can be carried out adequately.

Solution to Problem

One aspect of the present invention provides a user terminal that has a transmission section that transmits an uplink shared channel, an uplink control channel and an uplink reference signal, and a control section that controls the transmission of the uplink shared channel, the uplink control channel and/or the uplink reference signal based on the result of listening in the uplink, and, in this user terminal, when the uplink reference signal is configured to be transmitted in a subframe in which the uplink shared channel and/or the uplink control channel are transmitted, the control section controls the transmission of the uplink reference signal based on the result of listening that is executed before the uplink shared channel and/or the uplink control channel are transmitted.

Advantageous Effects of Invention

According to one aspect of the present invention, when UL transmission is controlled based on the result of listening, the listening operation that accompanies UL transmission and/or UL transmission can be carried out adequately.

BRIEF DESCRIPTION OF DRAWINGS

FIG. 5 provide diagrams to show an example of SRS transmission control in UL where LBT is used;

DESCRIPTION OF EMBODIMENTS

FIG. 1 show examples of operation modes of a radio communication system (LTE-U) that runs LTE in unlicensed bands. As shown in FIG. 1, a plurality of scenarios such as carrier aggregation (CA), dual connectivity (DC) and stand-alone (SA) are possible scenarios to use LTE in unlicensed bands.

Figure 1A:
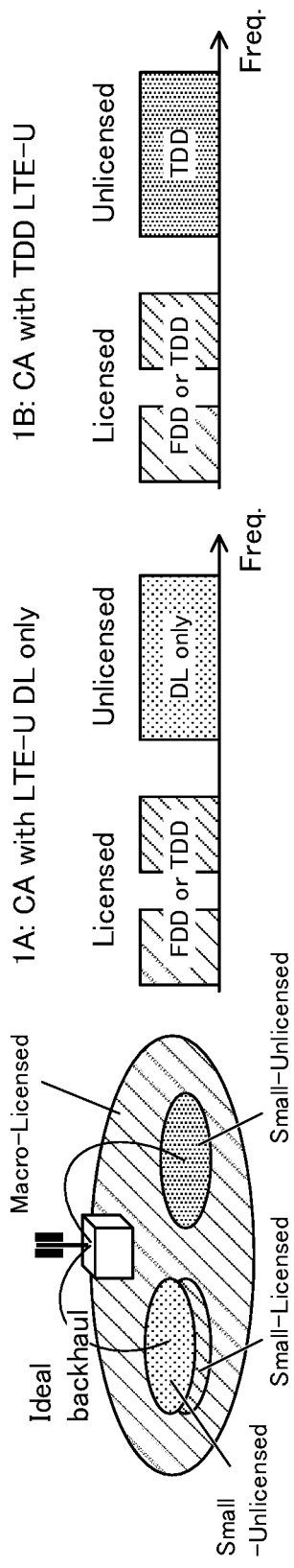
FIG. 1 provide diagrams to show examples of modes of operation in the event LTE is used in unlicensed bands.

FIG. 1A shows a scenario to employ carrier aggregation (CA) by using licensed bands and unlicensed bands. CA is a technique to bundle a plurality of frequency blocks (also referred to as "component carriers" (CCs), "cells," etc.) into a wide band.

With the example shown in FIG. 1A, a case is illustrated in which a macro cell and/or a small cell to use licensed bands and small cells to use unlicensed bands employ CA. When CA is employed, one radio base station's scheduler controls the scheduling of a plurality of CCs. Based on this, CA may be referred to as "intra-base station CA" (intra-eNB CA) as well.

In this case, a small cell to use an unlicensed band may use a carrier for exclusive use for DL communication (scenario 1A), or use TDD to carry out both UL communication and DL communication (scenario 1B). Note that FDD and/or TDD can be used in licensed bands.

Furthermore, a (co-located) structure may be employed here in which a licensed band and an unlicensed band are transmitted and received via one transmitting/receiving point (for example, a radio base station). In this case, the transmitting/receiving point can communicate with user terminals by using both the licensed band and the unlicensed band. Alternatively, it is equally possible to employ a (non-co-located) structure in which a licensed band and an unlicensed band are transmitted and received via different transmitting/receiving points (for example, one via a radio base station and the other one via an RRH (Remote Radio Head) that is connected with the radio base station).

Figure 1B:
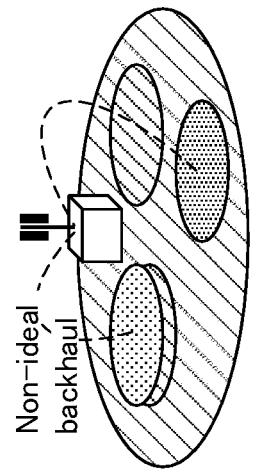

FIG. 1B show a scenario to employ dual connectivity (DC) by using licensed bands and unlicensed bands. DC is the same as CA in bundling a plurality of CCs (or cells) into a wide band. CA holds the premise that CCs (or cells) are connected via ideal backhaul and is capable of coordinated control that produces very little delay time. By contrast with this, DC presumes cases in which cells are connected via non-ideal backhaul, which produces delay time that is more than negligible.

Consequently, in dual connectivity, cells are run by separate base stations, and user terminals communicate by connecting with cells (or CCs) that are run by different base stations in different frequencies. So, when dual connectivity is employed, a plurality of schedulers are provided individually, and these multiple schedulers each control the scheduling of one or more cells (CCs) managed thereunder. Based on this, dual connectivity may be referred to as "inter-base station CA" (inter-eNB CA). Note that, in dual connectivity, carrier aggregation (intra-eNB CA) may be employed per individual scheduler (that is, base station) that is provided.

The example shown in FIG. 1B illustrates a case where a macro cell to use a licensed band and small cells to use unlicensed bands employ DC. In this case, a small cell to use an unlicensed band may use a carrier for exclusive use for DL communication (scenario 2A). Alternatively, TDD to carry out both UL communication and DL communication may be used (scenario 2B). Note that the macro cell to use a licensed band can use FDD and/or TDD.

Figure 1C:
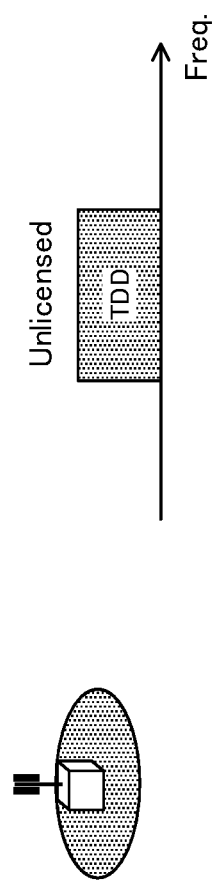

In the example shown in FIG. 1C, stand-alone (SA) is employed, in which a cell to run LTE by using an unlicensed band operates alone (scenario 3). Stand-alone here means that communication with terminals is possible without employing CA or DC. In scenario 3, the unlicensed band can be run in a TDD band.

Also, in the operation modes of CA/DC shown in FIG. 1A and FIG. 1B, for example, the licensed band CC can be used as the primary cell (PCell) and the unlicensed band CCs can be used as secondary cells (SCells). The primary cell (PCell) refers to the cell that manages RRC connection, handover and so on when CA/DC is used, and is also a cell that requires UL communication in order to receive data and feedback signals from terminals. The primary cell is always configured in the uplink and the downlink. A secondary cell (SCell) refers to another cell that is configured apart from the primary cell when CA/DC is employed. Secondary cells may be configured in the downlink alone, or may be configured in both the uplink and the downlink at the same time.

Note that, as shown in above FIG. 1A (CA) and FIG. 1B (DC), a mode to presume the presence of licensed-band LTE (licensed LTE) when running LTE-U is referred to as "LAA" (Licensed-Assisted Access) or "LAA-LTE." In LAA, licensed band LTE and unlicensed band LTE are coordinated so as to allow communication with user terminals. In LAA, a transmission point (for example, a radio base station eNB) to use a licensed band and a transmission point to use an unlicensed band can be connected via a backhaul link (for example, optical fiber, the X2 interface and so on) when being a distance apart.

Now, the premise of existing LTE/LTE-A is that it is run in licensed bands, and therefore each operator is allocated a different frequency band. However, unlike a licensed band, an unlicensed band is not limited to use by a specific provider. When run in an unlicensed band, LTE may be carried out without even synchronization, coordination and/or cooperation between different operators and/or non-operators. In this case, a plurality of operators and/or systems share and use the same frequency in the unlicensed band, and therefore there is a threat of producing cross-interference.

Figure 2:
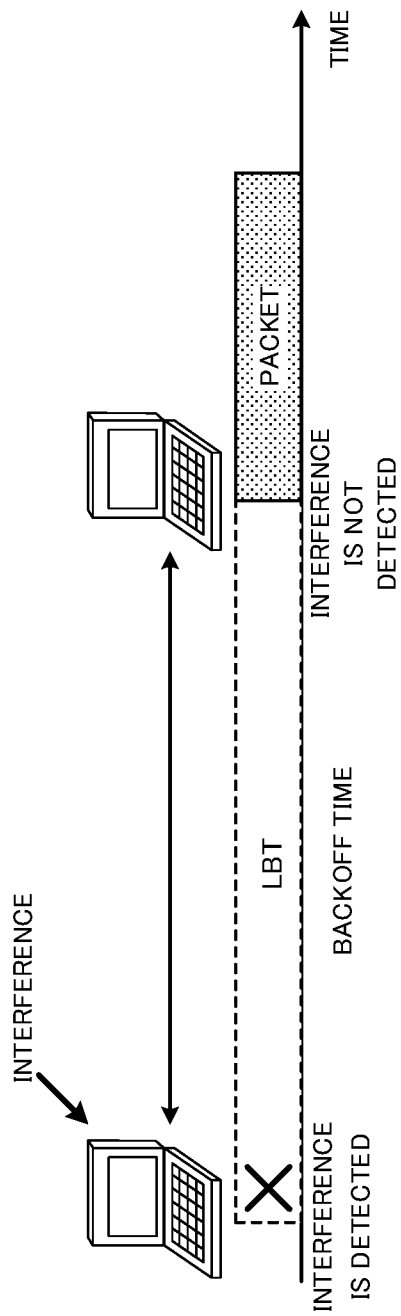
FIG. 2 is a diagram to show an example of transmission control for use when listening (LBT) is used.

Consequently, in Wi-Fi systems that are run in unlicensed bands, carrier sense multiple access/collision avoidance (CSMA/CA), which is based on the mechanism of LBT (Listen Before Talk), is employed. To be more specific, for example, a method, in which each transmission point (TP), access point (AP), Wi-Fi terminal (STA: Station) and so on perform "listening" (CCA: Clear Channel Assessment) before carrying out transmission, and carries out transmission only when there is no signal beyond a predetermined level, is used. When there is a signal to exceed a predetermined level, a waiting time is provided, which is determined on a random basis, and, following this, listening is performed again (see FIG. 2).

So, a study is in progress to apply transmission control that is based on the result of listening to LTE/LTE-A systems (for example, LAA) that are run in unlicensed bands. Note that, in the present description, "listening" refers to the operation which a radio base station and/or a user terminal performs before transmitting signals in order to check whether or not signals to exceed a predetermined level (for example, predetermined power) are being transmitted from other transmission points. Also, the "listening" that is performed by radio base stations and/or user terminals may be referred to as "LBT" (Listen Before Talk), "CCA" (Clear Channel Assessment) and so on. In the following description, the listening that is performed by user terminals will be referred to simply as "LBT."

For example, a radio base station and/or a user terminal perform listening (LBT) before transmitting signals in an unlicensed band cell, and checks whether other systems (for example, Wi-Fi) and/or other operators are communicating. If, as a result of listening, the received signal intensity from other systems and/or other LAA transmission points is equal to or lower than a predetermined value, the radio base station and/or the user terminal judges that the channel is in the idle state (LBT_idle), and transmits signals. On the other hand, if, as a result of listening, the received signal intensity from other systems and/or other LAA transmission points is greater than a predetermined value, the radio base station and/or the user terminal judges that the channel is in the busy state (LBT_busy), and limits signal transmission. As to how to limit signal transmission, making a transition to another carrier by way of DFS (Dynamic Frequency Selection), applying transmission power control (TPC), or holding (stopping) transmission may be possible. In the following description, cases in which signal transmission is limited by way of holding (stopping) signal transmission will be described as examples.

In this way, by using LBT in communication in LTE/LTE-A systems that are run in unlicensed bands, it becomes possible to reduce the interference with other systems and/or the like.

However, when a user terminal controls UL transmission based on the result of LBT in LTE/LTE-A, how to control the LBT operation (for example, LBT timing and so on) is the problem.

In an LTE/LTE-A system (for example, a licensed band), a user terminal transmits uplink reference signals in addition to control signals (for example, the PUCCH) and data signals (for example, the PUSCH). As uplink reference signals, a user terminal can transmit, for example, channel quality measurement reference signals (SRS: Sounding Reference Signal). The radio base station can measure the quality of UL based on SRSs transmitted from user terminals, and controls UL scheduling and so on based on the quality of UL.

A periodic SRS, which is transmitted periodically, and an aperiodic SRS, which is transmitted aperiodically, are both supported as SRSs to be transmitted from user terminals. A user terminal controls the transmission of a periodic SRS (P-SRS) in a predetermined cycle that is configured in a higher layer. The user terminal also control the transmission of an aperiodic SRS (A-SRS) based on SRS parameters (for example, the cycle, etc.) configured in a higher layer and triggers that are commanded in downlink control signals (DCI).

When the transmission of UL signals including the PUSCH, the PUCCH, the SRS and/or others is controlled based on the result of listening, how to control the listening operation is the problem. For example, it may be possible to control listening to be executed before every SRS is transmitted, in addition to before the PUSCH and/or the PUCCH are transmitted. However, when a periodic SRS (P-SRS) is configured in a short cycle (for example, 2 ms), a user terminal has to repeat listening and SRS transmission in a short cycle, even when the PUSCH and/or the PUCCH are not transmitted. As a result of this, there is a threat that the power consumption in the user terminal will increase.

Meanwhile, when the result of LBT in UL cannot be learned radio base station end, the radio base station has difficulty judging whether an SRS that is configured is properly transmitted from a user terminal. In particular, since the rate the LBT result to indicate the busy state ("LBT_busy") is yielded varies depending on the communicating environment, it is difficult to learn, on the radio base station end, how properly SRSs are transmitted. In this way, if SRSs are not properly transmitted at predetermined timings, there is a threat that the radio base station becomes unable to measure UL quality adequately.

So, the present inventors have come up with the idea of controlling the listening operation (for example, timing) and/or the UL reference signal transmission operation when a user terminal controls UL transmission based on signal detection/measurement results transmitted from other transmission points. For example, a user terminal controls the listening operation and/or transmission operation for uplink reference signals (for example, SRSs) based on whether or not uplink data (PUSCH) and/or uplink control signals (PUCCH) are transmitted.

According to one aspect of the present embodiment, a timing for LBT is given before a PUSCH and/or a PUCCH (hereinafter also referred to as "PUSCH/PUCCH") are transmitted, or before an SRS is transmitted. Also, if a PUSCH/PUCCH are not transmitted in subframes in which an SRS is transmitted, LBT is executed for the transmission of the SRS. Furthermore, when a PUSCH/PUCCH are transmitted in subframes in which an SRS is transmitted, the LBT for the PUCCH/PUSCH transmission and the LBT for the SRS transmission are shared. Note that the LBT timing for PUCCH/PUSCH transmission and the LBT timing for the SRS may be configured in the same period in each subframe, or may be configured in different periods.

According to another aspect, a user terminal can transmit an SRS when a PUSCH and a PUCCH are transmitted in subframes in which the SRS is transmitted, and limit the transmission of the SRS in subframes in which a PUSCH and a PUCCH are not transmitted.

Also, even when a PUSCH and a PUCCH are not transmitted in a subframe (n) in which an SRS is transmitted, the SRS can be controlled to be transmitted if a PUSCH/PUCCH are transmitted in the next subframe (n+1). In this case, the LBT to be executed before the transmission of a PUSCH/PUCCH in the next subframe (n+1) and the LBT to be executed for the SRS that is multiplexed over the last symbol of subframe (n) may be executed on a shared basis.

Now, the present embodiment will be described below in detail with reference to the accompanying drawings. Note that, although SRSs will be described as examples of uplink reference signals in the following description, the present embodiment is by no means limited to these. Also, although the following description will be given assuming that a licensed band is a carrier where LBT is not configured and an unlicensed band is a carrier where LBT is configured, the present embodiment is by no means limited to this. For example, a licensed band may as well be a carrier where LBT is configured. That is, the present embodiment is applicable to any carrier in which LBT is configured, regardless of whether this carrier is a licensed band or an unlicensed band.

First Example

A case will be described with a first example where the listening (LBT) timings in UL are controlled by taking PUCCH/PUSCH transmission and SRS transmission into consideration.

Figure 3:
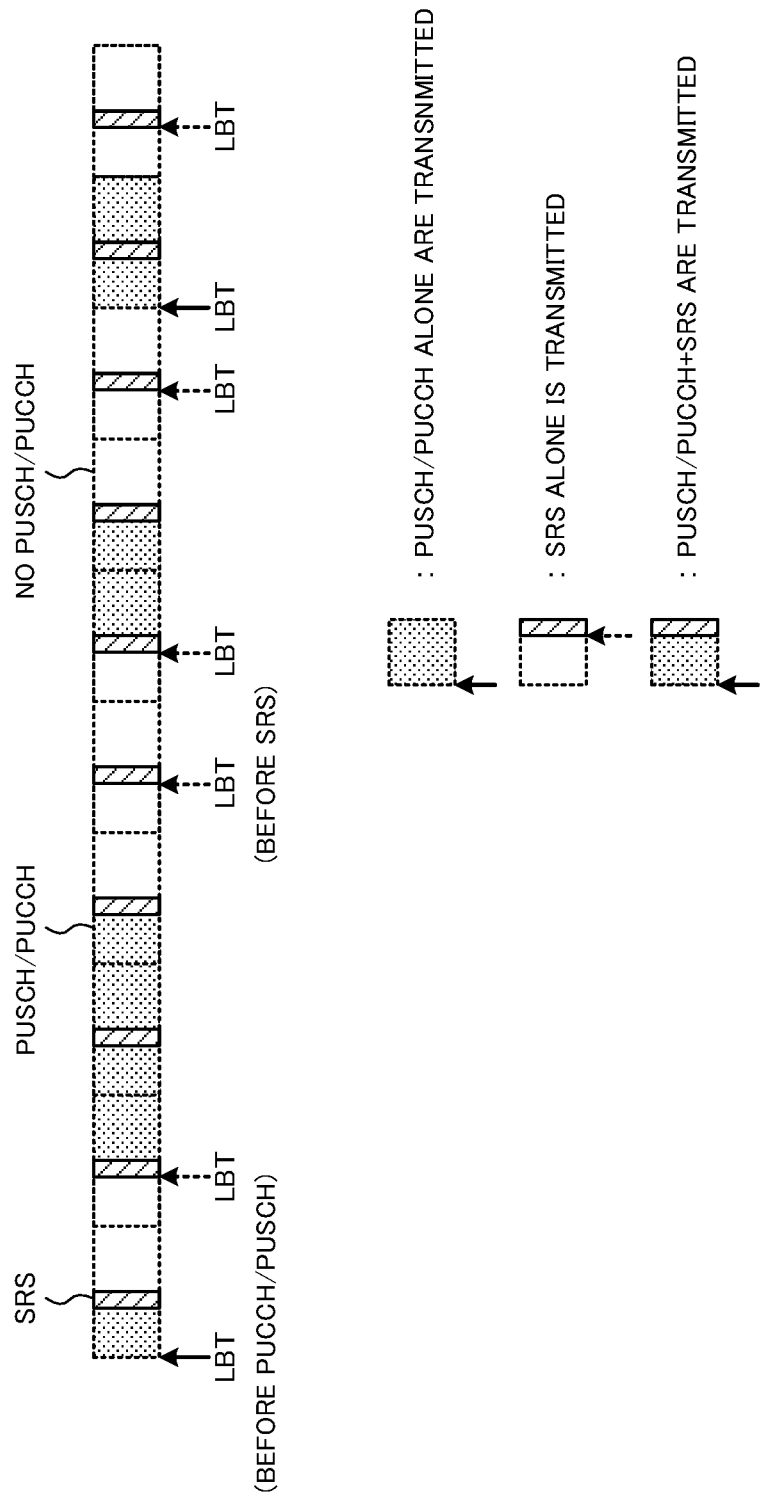
FIG. 3 is a diagram to show examples of LBT timings for UL signals (the PUSCH/PUCCH and the SRS)

FIG. 3 shows examples of LBT timings in the first example. FIG. 3 shows a case where LBT is executed immediately before PUCCH/PUSCH transmission or immediately before SRS transmission. Note that, here, "immediately before PUCCH/PUSCH transmission" refers to an area (symbol) that precedes the area where the PUSCH/PUCCH are allocated. For example, this may be an area to include at least the symbols that is one symbol before the symbol in which the PUSCH/PUCCH are allocated. The area (symbol) that precedes the area where the PUSCH/PUCCH are allocated may be in the same subframe in which the PUSCH/PUCCH are allocated, or may be in the subframe that is one subframe before. The same holds with "immediately before SRS transmission."

For example, when a PUSCH/PUCCH are transmitted but an SRS is not transmitted, LBT is executed before these PUCCH/PUSCH are transmitted (first timing). In this case, LBT can be executed by using the top area of the subframe in which the PUCCH/PUSCH are transmitted (for example, an area including at least the top symbol). Alternatively, LBT may be executed by using an area at the end of the subframe that is one subframe before the subframe in which the PUSCH/PUCCH are transmitted (for example, an area including at least the last symbol). If the result listening shows that no signals from other transmission points are detected (for example, when the received power is equal to lower than a predetermined value), user terminal transmits the PUSCH/PUCCH.

Also, in a subframe in which a PUSCH and a PUCCH are not transmitted and an SRS alone is transmitted, LBT is executed before the SRS is transmitted (second timing). In this case, LBT can be executed by using an area to include the symbol immediately before the symbol in which the SRS is allocated. If the result listening shows that no signals from other transmission points are detected, the user terminal transmits the SRS.

Also, in a subframe in which a PUSCH/PUCCH and an SRS are transmitted, LBT is executed before these PUSCH/PUCCH are transmitted (the first timing). In this case, the timing of LBT can be made the same as in the case in which a PUSCH/PUCCH are transmitted but an SRS is not transmitted. That is, since it is possible to execute the LBT for the PUCCH/PUSCH transmission and the LBT for the SRS transmission on a shared basis (in one time), the number of times to execute LBT can be reduced.

In this way, by controlling the LBT operation (the timing of LBT timing and/or others) in a subframe in which an SRS is transmitted by taking the transmission of a PUSCH/PUCCH into consideration, it is possible to reduce the number of times of LBT in UL. By this means, it is possible to reduce the number of times or the frequency a user terminal repeats receipt (LBT) and transmission, reduce the user terminal's battery consumption, and reduce the rate of detecting LBT_busy and producing delays in communication.

Note that a structure may be used here in which, when UL signals are transmitted in a plurality of subframes in a row, LBT is executed before this continuous transmission (for example, immediately before this continuous transmission is started). For example, when an SRS alone is transmitted in the subframe that is one subframe before a subframe in which a PUSCH/PUCCH are transmitted, LBT can be executed before this SRS is transmitted (second timing). In this case, again, the LBT for the PUCCH/PUSCH transmission and the LBT for the SRS transmission can be executed on a shared basis (in one time), the number of times to execute LBT can be reduced.

Second Example

A case has been described with first example in which, in a subframe in which a PUSCH and a PUCCH are not transmitted but an SRS is transmitted, LBT is executed before the SRS is transmitted (second timing). With a second example, a case will be described in which, in a subframe to execute LBT, the LBT timing for PUCCH/PUSCH transmission (first timing) and the LBT timing for SRS transmission (second timing) are configured to be the same.

Figure 4:
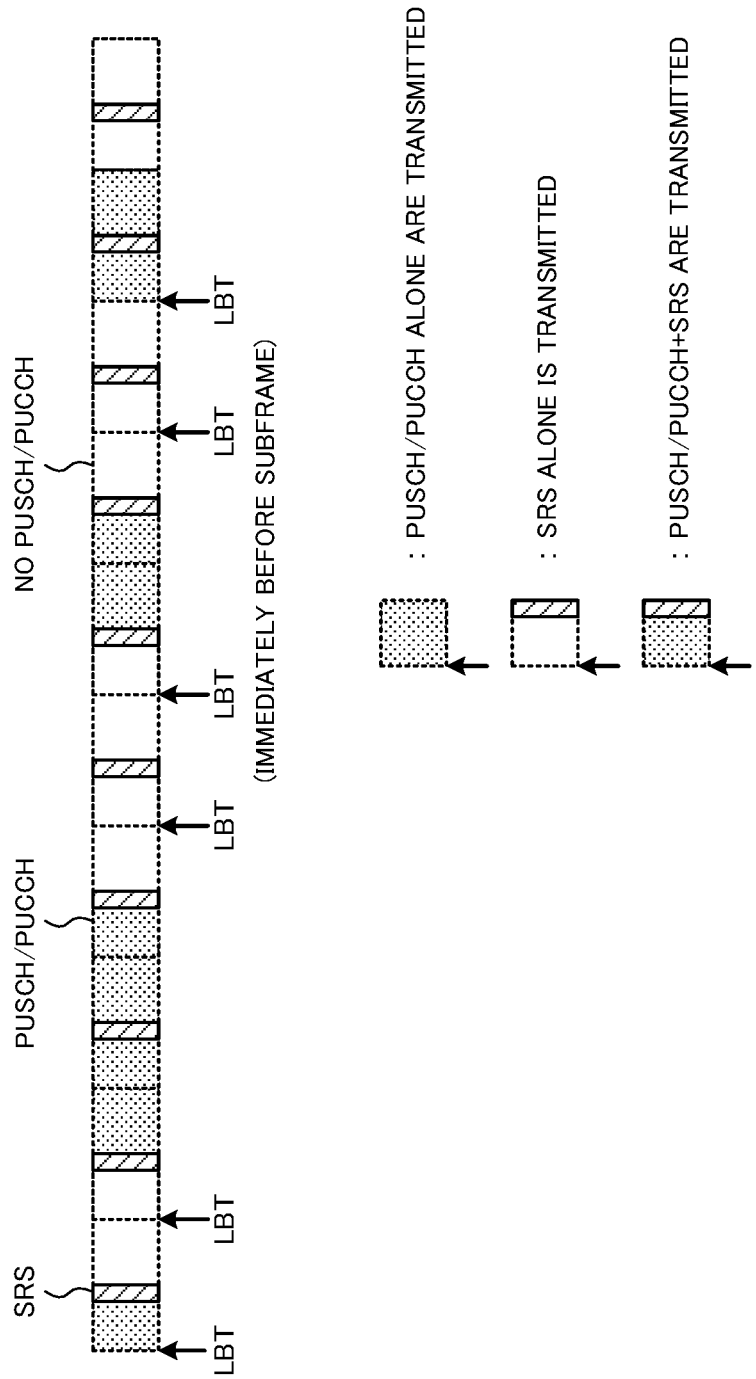
FIG. 4 is a diagram to show other examples of LBT timings for UL signals (the PUSCH/PUCCH and the SRS)

FIG. 4 shows examples of LBT timings in the second example. FIG. 4 shows a case where LBT is executed at the same timing when a PUSCH/PUCCH are transmitted but an SRS is not transmitted, when an SRS is transmitted but a PUSCH and a PUCCH are not transmitted and when a PUSCH/PUCCH and an SRS are transmitted. "The same timing" means that LBT is executed by using areas that are specified based on the same cycle/time offset.

For example, when an SRS alone is transmitted, the same LBT timing as when a PUSCH/PUCCH are transmitted (for example, immediately before the subframe that is allocated) is applied. In this case, regardless of the type of UL signal transmission, one LBT timing can be configured in a subframe. By this means, when a user terminal performs LBT, it is possible to simplify the LBT process. Note that, in FIG. 4, when a PUSCH and a PUCCH are not transmitted and an SRS alone is transmitted in a given subframe, a period in which no UL transmission is made is produced between the LBT and the SRS transmission.

Also, when UL signals are transmitted in a plurality of subframes in a row, it is possible to execute LBT for the UL signal transmissions in multiple subframes on a shared basis, before this continuous transmission is started (for example, in a predetermined area in the subframe that is immediately before the continuous transmission).

In this way, by controlling the LBT operation in a subframe in which an SRS is transmitted by taking into consideration the transmission of a PUSCH/PUCCH, and, furthermore, making the LBT timings in the subframe the same, it is possible to reduce the number of times to execute LBT, and, furthermore, simplify the LBT operation.

Third Example

A case will be described with a third example where, when UL transmission is controlled based on the result of listening, UL reference signals (for example, SRSs) are transmitted only in limited, predetermined subframes.

FIG. 5A shows an example of a UL reference signal transmission control method according to a third example. A user terminal limits the transmission of uplink reference signals (for example, SRSs) to the same subframes as subframes in which a PUSCH/PUCCH are transmitted. That is, a user terminal transmits an SRS only in subframes in which a PUSCH/PUCCH are transmitted.

In this case, the user terminal executes LBT before a PUSCH/PUCCH are transmitted, and controls the transmission of the PUSCH, the PUCCH and the SRS based on the result of this LBT. That is, LBT can be executed on a shared basis (in one time) for a PUSCH, a PUCCH and an SRS that are transmitted in the same subframe. Also, by controlling the transmission of SRSs in accordance with PUCCH/PUSCH transmission, it is possible to skip LBT for SRS transmission alone.

Note that the timing to execute LBT can be determined based on the transmission of a PUSCH/PUCCH. To be more specific, the LBT timing for the PUCCH/PUSCH transmission (first timing) according to the above first example or the LBT timing according to the second example may be applied.

Also, the radio base station can configure/trigger SRS transmission in UL in the same way as in existing LTE/LTE-A (for example, a licensed band). However, even when an SRS is configured, a user terminal controls the SRS to be transmitted or not to be transmitted (dropped), based on predetermined conditions. For example, when the result of listening in UL shows LBT_idle, PUCCH/PUSCH transmission takes places in a subframe to make UL transmission, and an SRS is transmitted (triggered) in this subframe, the user terminal can transmit the SRS.

Also, a structure may be employed here in which, when a PUSCH/PUCCH are transmitted in a plurality of subframes in a row, LBT is executed once before this continuous transmission (for example, immediately before the continuous transmission is started). Note that, although FIG. 5A shows a case where LBT is executed before each UL transmission (before the first UL transmission in the event of continuous transmission), the present embodiment is by no means limited to this. If the result of LBT in UL is LBT_idle, it is possible to allow UL signals to be transmitted for a predetermined period (also referred to as the "burst period"). In this case, a structure may be employed in which, during the burst period, an SRS alone is transmitted in subframes in which a PUSCH and/or PUCCH are not transmitted.

In this way, by limiting/restricting the transmission of an SRS based on whether or not a PUSCH/PUCCH are transmitted, it is possible to reduce the number of times to execute LBT in UL, and, furthermore, simplify the LBT operation.

Also, when the same LBT timing is applied to PUSCH/PUCCH transmission and SRS transmission, it is possible to prevent a blank period from being produced between the LBT and the SRS transmission by limiting/restricting the transmission of an SRS based on whether or not a PUSCH/PUCCH are transmitted. By this means, it is possible to prevent collisions with signals that are produced in other transmission points (for example, Wi-Fi, etc.) during the blank period between LBT and SRS transmission (see FIG. 5B).

Also, the radio base station can judge whether an SRS to be transmitted from a user terminal has been dropped or has been transmitted properly, based on the result of PUSCH/PUCCH detection. Also, by employing the third example, SRSs can be transmitted more adequately in cells with heavier traffic, and more reliable link adaptation can be executed.

(Variation)

Note that, although FIG. 5A shows an example in which the transmission of SRSs is limited to when a PUSCH/PUCCH are present in the same cell/subframe, this is by no means limiting. For example, when an SRS is configured in a subframe (n−1) that is one subframe before a subframe (n) in which a PUSCH/PUCCH are transmitted, this SRS can be transmitted. That is, if there is a subframe in which a PUSCH/PUCCH are not transmitted, an SRS alone can be transmitted if a PUSCH/PUCCH are transmitted in the next subframe (see FIG. 6).

For example, when the result of listening in UL is LBT_idle, an SRS is transmitted (triggered) in the LBT timing, and a PUCCH/PUSCH are transmitted in the immediately subsequent subframe, the user terminal transmit the SRS $^{(?)}$ transmission. In this case, the user terminal can execute LBT for the SRS that is transmitted in subframe (n−1) and for the PUSCH/PUCCH that are transmitted in the next subframe (n) on a shared basis (on one time).

<Operation Steps>

An example of the steps of operation in the third example will be described.

The radio base station configures a periodic SRS and/or an aperiodic SRS for a user terminal that performs the listening operation in UL (for example, a user terminal that is connected with an unlicensed band). That is, in a user terminal that uses an LAA system, a periodic SRS and/or an aperiodic SRS are configured in the same way as in existing LTE/LTE-A (for example, licensed band) even in an unlicensed band. Note that the configuration of periodic SRSs and/or aperiodic SRSs by the radio base station is by no means limited to unlicensed bands, and it is equally possible to use licensed bands.

A user terminal controls UL transmission in a CC (or an unlicensed band CC) where the LBT operation is required, based on the result of LBT. To be more specific, when the result of LBT is LBT_idle, the user terminal transmits a PUSCH and/or PUCCH.

Also, the user terminal transmits an SRS when the result of LBT is LBT_idle and this SRS is configured at the timing a PUSCH and/PUCCH are transmitted (for example, the transmitting subframe).

The user terminal does not transmit (in other words, drops) an SRS otherwise (for example, when the result of LBT is LBT_busy, when a PUSCH and/or a PUCCH are not transmitted, etc.). By this means, it is possible to execute LBT only once for PUSCH and/or PUCCH transmission and for SRS transmission, and, furthermore, the radio base station can judge whether an SRS to be transmitted from the user terminal has been dropped or has been transmitted properly, based on the result of PUSCH and/or PUCCH detection.

Note that, when the result of LBT is LBT_idle and an SRS is configured in a subframe that is immediately before the timing a PUSCH and/PUCCH are transmitted (for example, the transmitting subframe), the user terminal transmits the SRS.

Fourth Example

A case will be described with a fourth example where an SRS is transmitted in such a long cycle that LBT is not necessary (LBT-exempt).

In a system that requires LBT, transmission control that is based on LBT results is required for signals that are transmitted in a cycle equal to lower than a predetermined cycle. Meanwhile, signals having a long transmission cycle (for example, 20 ms or more) may be controlled without requiring LBT (LBT-exempt).

Figure 7:
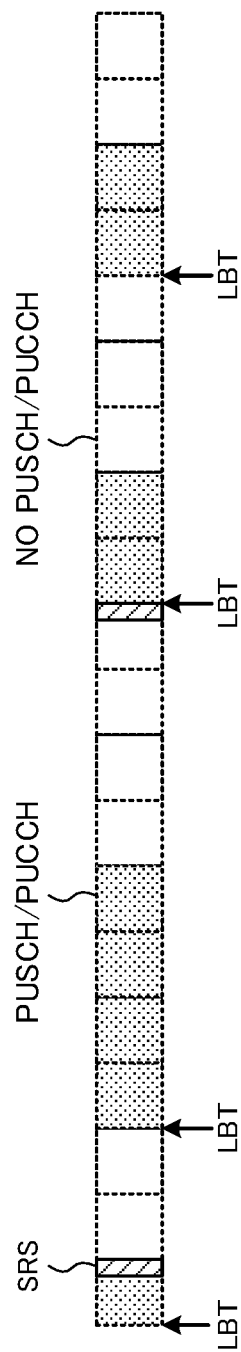
FIG. 7 is a diagram to show another example of SRS transmission control in UL where LBT is used.

Consequently, according to the fourth example, the transmission of SRSs is controlled in a long cycle (for example, a 20-ms cycle) that makes LBT unnecessary (see FIG. 7). By this means, it is possible to reduce the duty cycle of SRS transmission and transmit SRSs in LBT-exempt transmission. In this case, in CCs where the LBT operation is required (or in unlicensed band CCs), radio base stations and/or user terminals can configure and control the transmission of SRSs in a long cycle (for example, a cycle of 20 ms or more).

Note that the fourth example may be combined with other examples (the first to the third example) and used. In this case, it is possible to combine and use a long-cycle SRS that is LBT-exempt, and a periodic SRS and/or an aperiodic SRS that is LBT-required.

(Structure of Radio Communication System)

Now, the structure of the radio communication system according to the present embodiment will be described below. In this radio communication system, the above-described radio communication methods of the first example to the fourth example are employed. Note that the above-described radio communication methods of the first example to the fourth example may be applied individually or may be applied in combination.

Figure 8:
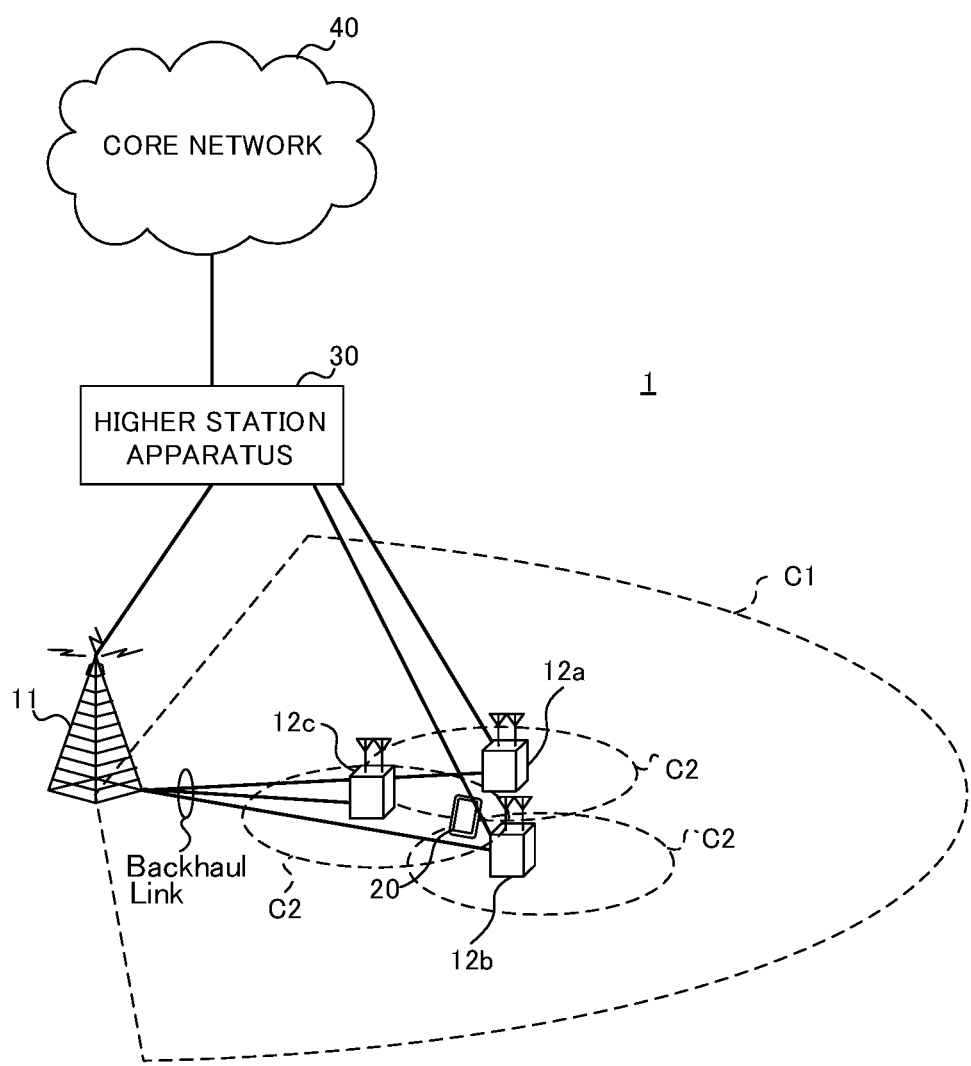
FIG. 8 is a schematic diagram to show an example of a radio communication system according to the present embodiment.

FIG. 8 is a diagram to show a schematic structure of the radio communication system according to the present embodiment. Note that the radio communication system shown in FIG. 8 is, for example, an LTE system or a system to incorporate SUPER 3G. This radio communication system can adopt carrier aggregation (CA) to group a plurality of fundamental frequency blocks (component carriers) into one, where the LTE system bandwidth constitutes one unit, and/or adopt dual connectivity (DC). Also, the radio communication system shown in FIG. 8 has a licensed band and an unlicensed band (LTE-U base station). Note that this radio communication system may be referred to as "IMT-Advanced," or may be referred to as "4G," "5G," "FRA" (Future Radio Access) and so on.

The radio communication system 1 shown in FIG. 8 includes a radio base station 11 that forms a macro cell C1, and radio base station s 12a to 12c that form small cells C2, which are placed within the macro cell C1 and which are narrower than the macro cell C1. Also, user terminals 20 are placed in the macro cell C1 and in each small cell C2. For example, a mode to use the macro cell C1 in a licensed band and use at least one of the small cells C2 in an unlicensed band (LTE-U) may be possible. Also, a mode to use part of the small cells C2, in addition to the macro cell, in licensed bands, and use the other small cells C2 in unlicensed bands may be possible.

The user terminals 20 can connect with both the radio base station 11 and the radio base stations 12. The user terminals 20 can use the macro cell C1 and the small cells C2, which use different frequencies, at the same time, by means of CA or DC. In this case, it is possible to transmit information (assist information) about a radio base station 12 that uses an unlicensed band, from the radio base station 11 that uses a licensed band to the user terminals 20. Also, when CA is executed between a licensed band and an unlicensed band, a structure may be employed in which one radio base station (for example, the radio base station 11) controls the scheduling of licensed band cells and unlicensed band cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base station s 12 (or between the radio base stations 12), wire connection (optical fiber, the X2 interface and so on) or wireless connection can be established.

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "RRHs" (Remote Radio Heads), "micro base stations," "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may include both mobile communication terminals and fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands.

Now, communication channels used in the radio communication system shown in FIG. 8 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are communicated by the PDSCH. Scheduling information for the PDSCH and the PUSCH and so on are communicated by the PDCCH (Physical Downlink Control CHannel). The number of OFDM symbols to use for the PDCCH is communicated by the PCFICH (Physical Control Format Indicator CHannel). HARQ ACKs/NACKs for the PUSCH are communicated by the PHICH (Physical Hybrid-ARQ Indicator CHannel). Also, the scheduling information for the PDSCH and the PUSCH and so on may be communicated by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are communicated by this PUSCH. Also, downlink channel state information (CSI), delivery acknowledgment signals (also referred to as "HARQ-ACKs," "A/Ns," or "ACKs/NACKs"), scheduling requests (SRs) and so on are communicated by the PUCCH. Note that the channel state information includes radio quality information (CQI), preceding matrix indicators (PMIs), rank indicators (RIs) and so on.

Figure 9:
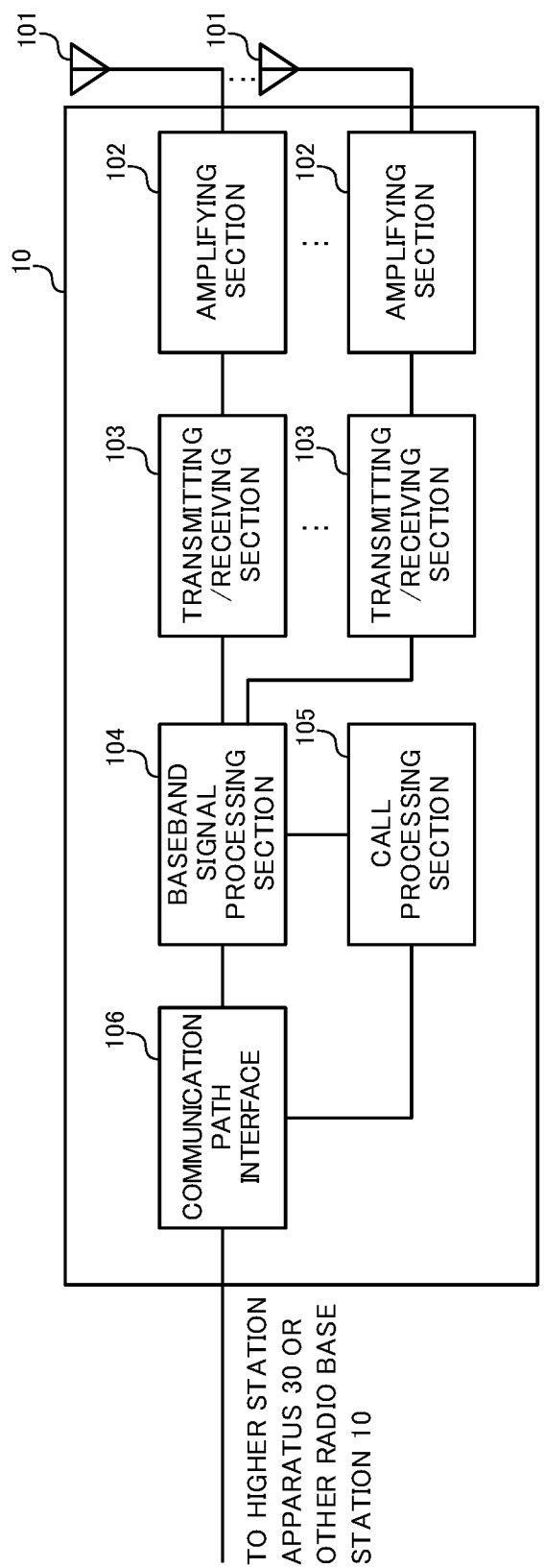
FIG. 9 is a diagram to explain an overall structure of a radio base station according to the present embodiment.

FIG. 9 is a diagram to show an overall structure of a radio base station 10 (which may be either a radio base station 11 or 12) according to the present embodiment. The radio base station 10 has a plurality of transmitting/receiving antennas 101 for MIMO communication, amplifying sections 102, transmitting/receiving sections 103 (transmitting sections/receiving sections), a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and forwarded to each transmitting/receiving section 103.

Also, the baseband signal processing section 104 reports, to the user terminal 20, control information for allowing communication in the cell (system information), through higher layer signaling (for example, RRC signaling, broadcast signals and so on). The information for allowing communication in the cell includes, for example, the uplink or downlink system bandwidth and so on. Also, information about the parameters of periodic SRSs and/or the parameters of aperiodic SRSs may be reported to the user terminals through higher layer signaling.

Also, information about listening (LBT) (for example, part or all of the LBT subframes, the LBT symbols, and LBT cycle) can be transmitted from the transmitting/receiving section 103 of the radio base station 10 to the user terminals. Also, when LBT is employed in TDD, the radio base station 10 transmits information about the UL/DL configuration (or the UL/DL configuration (DL-reference UL/DL configuration) to determine HARQ-ACK timings) to the user terminals, in addition to the information about LBT. For example, the radio base station 10 reports these pieces of information to the user terminals via a licensed band and/or an unlicensed band. Also, when the result of LBT is LBT_idle, the radio base station 10 may transmit a reference signal (DL-BRS) to report LBT_idle.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101. Note that the transmitting/receiving sections (transmitting section/receiving section) 103 can be transmitters/receivers, transmitting/receiving circuits (transmitting circuit/receiving circuit) or transmitting/receiving devices (transmitting device/receiving device) used in the technical field to which the present invention pertains.

Meanwhile, as for data to be transmitted from the user terminals 20 to the radio base station 10 on the uplink, radio frequency signals that are received in the transmitting/receiving antennas 101 are each amplified in the amplifying sections 102, converted into the baseband signal through frequency conversion in each transmitting/receiving section 103, and input in the baseband signal processing section 104.

In the baseband signal processing section 104, the user data that is included in the input baseband signal is subjected to an FFT process, an IDFT process, error correction decoding, a MAC retransmission control receiving process, and RLC layer and PDCP layer receiving processes, and the result is forwarded to the higher station apparatus 30 via the communication path interface 106. The call processing section 105 performs call processing such as setting up and releasing communication channels, manages the state of the radio base stations 10 and manages the radio resources.

Figure 10:
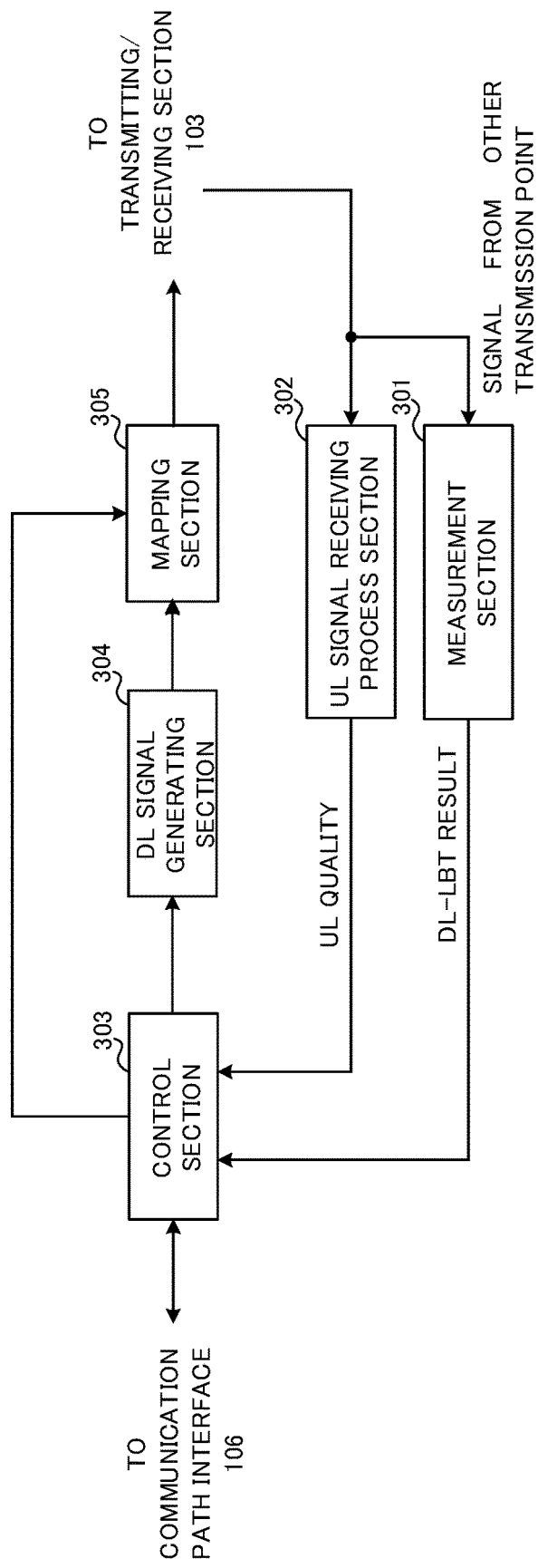
FIG. 10 is a diagram to explain a functional structure of a radio base station according to the present embodiment.

FIG. 10 is a diagram to show a principle functional structure of the baseband signal processing section 104 provided in the radio base station 10 according to the present embodiment. Note that, although FIG. 10 primarily shows functional blocks that pertain to characteristic parts of the present embodiment, the radio base station 10 has other functional blocks that are necessary for radio communication as well.

As shown in FIG. 10, the radio base station 10 has a measurement section 301, a UL signal receiving process section 302, a control section (scheduler) 303, a DL signal generating section 304, a mapping section (allocation control section) 305.

The measurement section 301 (detection section) detects/measures (LBT) signals transmitted from other transmission points (APs/TPs) in unlicensed bands. To be more specific, the measurement section 301 detects/measures signals from other transmission points at predetermined timings such as before transmitting DL signals, and outputs the detection/measurement results (LBT results) to the control section 303. For example, if a signal is detected, the measurement section 301 decides whether or not its power level is equal to or higher than a predetermined threshold, and reports the decision (LBT result) to the control section 303.

Also, the measurement section 301 can perform listening in UL, in addition to listening in DL. When UL listening is executed on the user terminal end, the measurement section 301 may execute DL listening alone. Note that the measurement section 301 can be measurer or a measurement circuit used in the technical field to which the present invention pertains.

The UL signal receiving process section 302 performs receiving processes (for example, the decoding process, the demodulation process and so on) of UL signals (the PUCCH, the PUSCH, reference signals (SRSs) and so on) transmitted from the user terminals. The information that is acquired in the UL signal receiving process section 302 (for example, the channel quality in the uplink, etc.) is output to the control section 303. Note that the UL signal receiving process section 302 can be a signal processor or a signal processing circuit used in the technical field to which the present invention pertains.

The control section (scheduler) 303 controls the allocation (transmission timings) of downlink data signals that are transmitted in the PDSCH, and downlink control signals (UL grants/DL assignments) that are communicated in the PDCCH and/or the enhanced PDCCH (EPDCCH). Also, the control section 303 controls the allocation (transmission timing) of system information (PBCH), synchronization signals (PSS/SSS) and downlink reference signals (CRS, CSI-RS and so on). Note that the control section 303 can be a controller, a scheduler, a control circuit or a control device used in the technical field to which the present invention pertains.

The control section 303 controls the transmissions of DL signals in unlicensed bands based on LBT results output from the measurement section 301. Also, control section 303 controls UL scheduling based on uplink quality measurement reference signals (SRSs) transmitted from the user terminals. Also, the control section 303 can determine the number of CCEs/ECCEs (aggregation level) to allocate to each terminal when the PDCCH is allocated, the coding rate and so on, based on the reference signals transmitted from the user terminals.

The transmission of uplink reference signals (SRSs) that are fed back from the user terminals is controlled based on UL LBT results. For example, listening can be executed immediately before a PUSCH/PUCCH are transmitted, or immediately before an SRS is transmitted (see FIG. 3). Also, listening can be performed immediately before the PUSCH/PUCCH are transmitted or for SRS transmission, by using one cycle/time offset (see FIG. 4).

Also, it is possible to control based on the assumption that an SRS is transmitted from a user terminal only when a PUSCH/PUCCH are transmitted in the same cell/subframe (see FIG. 5A). Alternatively, it is possible to control based on the assumption that an SRS is transmitted from a user terminal when a PUSCH/PUCCH are transmitted in the next subframe of the subframe in which the SRS is transmitted (see FIG. 6). Alternatively, it is also possible to control based on the assumption that an SRS is transmitted from a user terminal in a long cycle and therefore LBT is not necessary (see FIG. 7).

The DL signal generating section 304 generates DL signals based on commands from the control section 303. The DL signals may include DL control signals (the PDCCH signal, the EPDCCH signal, the PSS/SSS signals, the PBCH signal, etc.), downlink data signals (the PDSCH signal), downlink reference signals (the CRS, the CSI-RS, the DM-RS, etc.) and so on. Also, the DL signal generating section 304 may generate a DL-BRS when the result of DL-LBT is LBT_idle. Note that the DL signal generating section 304 can be formed with a signal generator or a signal generating circuit that is used in the technical field to which the present invention pertains.

Also, the mapping section (allocation control section) 305 controls the mapping (allocation) of DL signals based on commands from the control section 303. To be more specific, when an LBT result output from the measurement section 301 renders a decision that a DL signal can be transmitted, the mapping section 305 allocates a DL signal. Note that the mapping section 305 can be formed with a mapping circuit or a mapper that is used in the technical field to which the present invention pertains.

Figure 11:
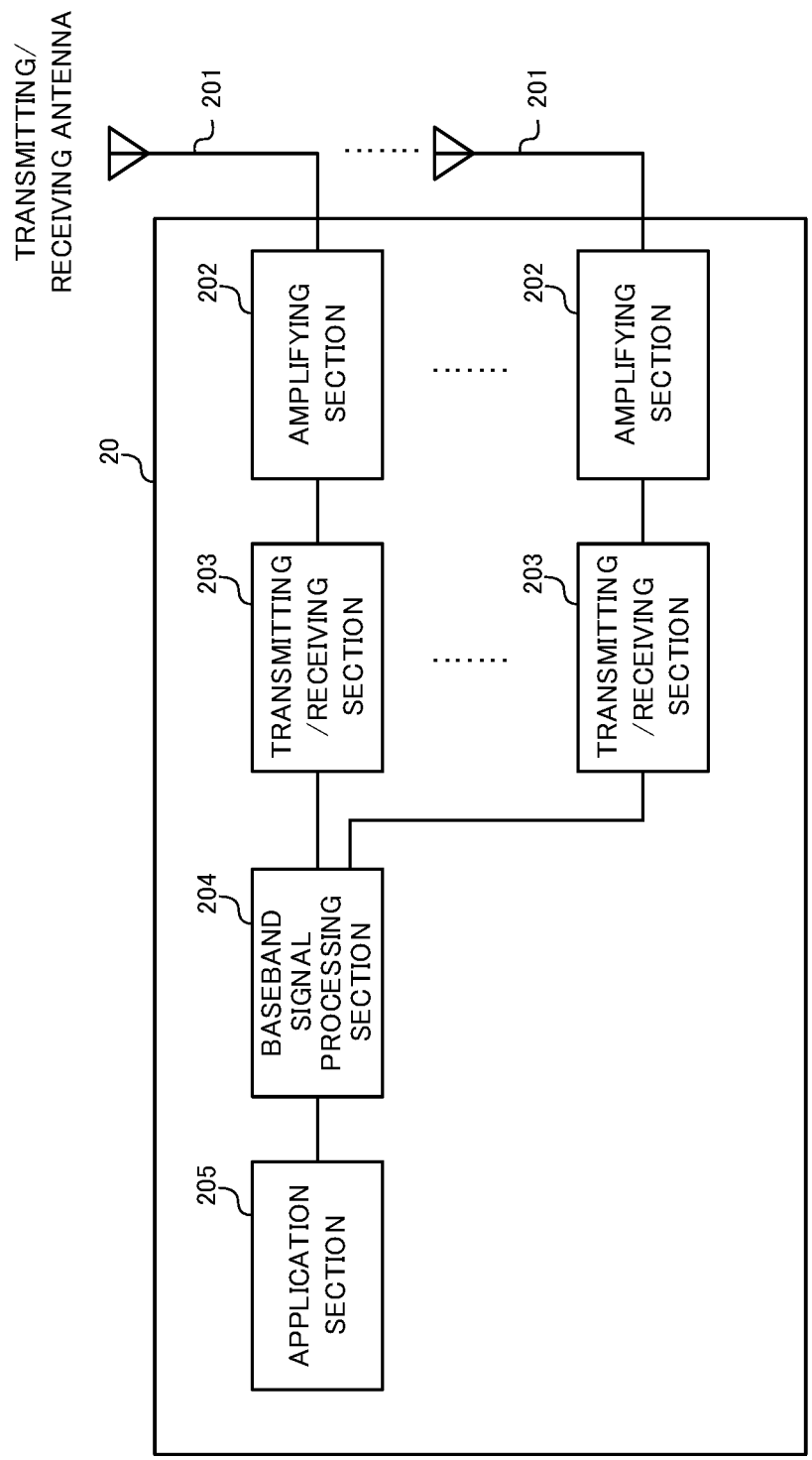
FIG. 11 is a diagram to explain an overall structure of a user terminal according to the present embodiment.

FIG. 11 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving sections and transmitting sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to receiving processes such as an FFT process, error correction decoding and retransmission control (Hybrid ARQ), in the baseband signal processing section 204. In this downlink data, downlink user data is forwarded to the application section 205. The application section 205 performs processes related to higher layers above the physical layer and the MAC layer. Furthermore, in the downlink data, broadcast information is also forwarded to the application section 205.

Meanwhile, uplink user data is input from the application section 205 to the baseband signal processing section 204. In the baseband signal processing section 204, a retransmission control (Hybrid ARQ) transmission process, channel coding, precoding, a DFT process, an IFFT process and so on are performed, and the result is forwarded to each transmitting/receiving section 203.

The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201. Also, the transmitting/receiving sections 203 can transmit a UL-BRS when the result of UL-LBT is LBT_idle. Note that the transmitting/receiving sections (transmitting section/receiving section) 203 can be transmitters/receivers, transmitting/receiving circuits (transmitting circuit/receiving circuit) or transmitting/receiving devices (transmitting device/receiving device) used in the technical field to which the present invention pertains.

Figure 12:
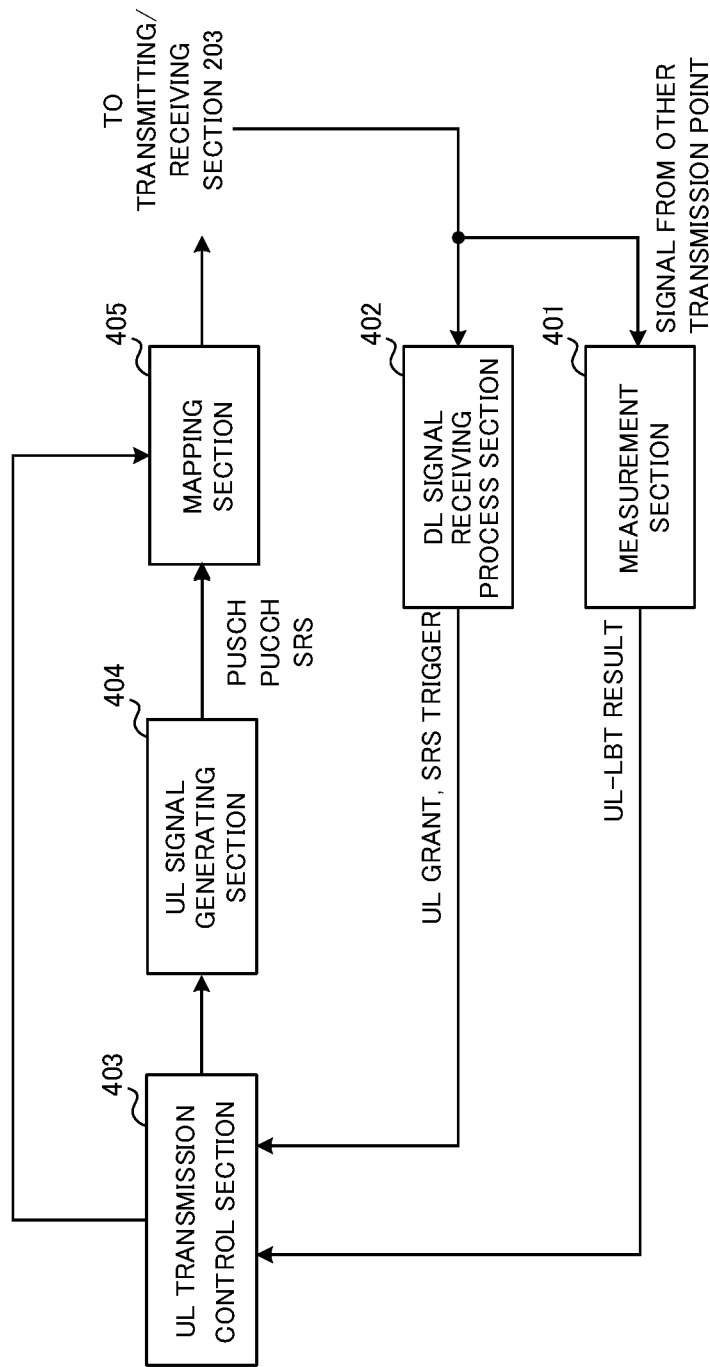
FIG. 12 is a diagram to explain a functional structure of a user terminal according to the present embodiment.

FIG. 12 is a diagram to show a principle functional structure of the baseband signal processing section 204 provided in the user terminal 20. Note that, although FIG. 12 primarily shows functional blocks that pertain to characteristic parts of the present embodiment, the user terminal 20 has other functional blocks that are necessary for radio communication as well.

As shown in FIG. 12, the user terminal 20 has a measurement section 401 (detection section), a DL signal receiving process section 402, a UL transmission control section 403 (control section), a UL signal generating section 404 and a mapping section 405. Note that, when LBT in UL commination is performed on the radio base station side, the measurement section 401 can be removed.

The measurement section 401 detects/measures (LBT) signals transmitted from other transmission points (APs/TPs) in unlicensed bands. To be more specific, the measurement section 401 detects/measures signals from other transmission points at predetermined timings such as immediately before transmitting UL signals, and outputs the detection/measurement results (LBT results) to the UL transmission control section 403. For example, if a signal is detected, the measurement section 401 decides whether or not its power level is equal to or higher than a predetermined threshold, and reports the decision (LBT result) to the UL transmission control section 403. Note that measurement section 401 can be a measurer or a measurement circuit used in the technical field to which the present invention pertains.

For example, the measurement section 401 can execute listening immediately before a PUSCH/PUCCH are transmitted or immediately before an SRS is transmitted (see FIG. 3). Also, the measurement section 401 can perform listening immediately before the PUSCH/PUCCH are transmitted or for SRS transmission, by using one cycle/time offset (see FIG. 4).

To be more specific, when an SRS is configured for transmission in a subframe in which a PUSCH/PUCCH are not transmitted, the measurement section 401 executes listening at a predetermined timing before the SRS is transmitted. The predetermined timing may be a timing immediately before where the SRS is placed (timing to include the symbol that is one symbol before the symbol in which the SRS is placed), or may be the same timing as the timing of listening that is executed before the PUSCH/PUCCH are transmitted.

The DL signal receiving process section 402 performs receiving processes (for example, the decoding process, the demodulation process and so on) for the DL signals transmitted in the licensed band or the unlicensed band. For example, the DL signal receiving process section 402 acquires a UL grant that is included in downlink control signals (for example, DCI formats 0 and 4) and outputs this to the UL transmission control section 403.

Also, when trigger information for an aperiodic SRS (A-SRS) that is included in downlink control signals is detected, the DL signal receiving process section 402 outputs this to the UL transmission control section 403. Note that the DL signal receiving process section 402 can be a signal processor or a signal processing circuit used in the technical field to which the present invention pertains.

The UL transmission control section 403 controls the transmission of UL signals (UL data, UL control signals, reference signals, etc.) to the radio base station in a licensed band and an unlicensed band (or, in an LBT-configured carrier and a non-LBT-configured carrier). Also, the UL transmission control section 403 controls the transmission in an unlicensed band based on the detection/measurement results (LBT results) from the measurement section 401. That is, by taking into consideration the UL transmission commands (UL grants) transmitted from the radio base station and the detection results (LBT results) from the measurement section 401, the UL transmission control section 403 controls the transmission of UL signals in an unlicensed band.

Also, when an SRS is configured for transmission in a subframe in which a PUSCH/PUCCH are not transmitted, the UL transmission control section 403 can control the SRS not to be transmitted in this subframe. Also, the UL transmission control section 403 can control an SRS to be transmitted when this SRS is configured in a subframe in which a PUSCH/PUCCH are transmitted, based on the result of listening (see FIG. 5A).

Figure 6:
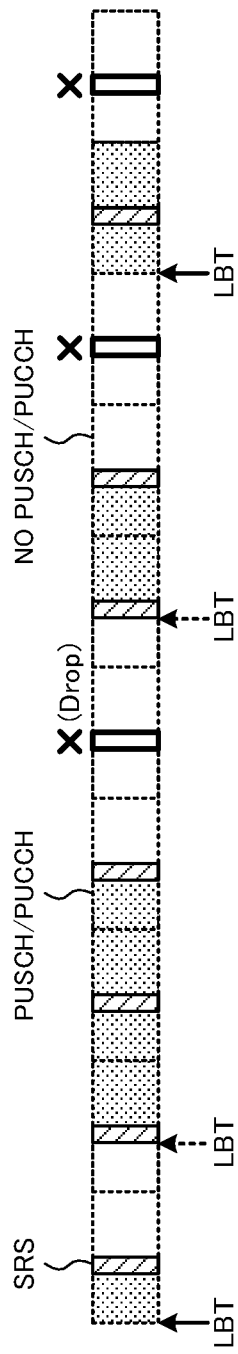
FIG. 6 is a diagram to show another example of SRS transmission control in UL where LBT is used.

Also, when an SRS is configured for transmission in a subframe in which a PUSCH/PUCCH are not transmitted and a PUSCH/PUCCH are transmitted in the next subframe of this subframe, the UL transmission control section 403 can control the transmission of the SRS based on the result of LBT (see FIG. 6). Also, when SRSs are transmitted in a long cycle that is equal to or longer than a predetermined cycle (for example, 20 ms), the UL transmission control section 403 can control the SRS to be transmitted regardless of the result of listening (see FIG. 7).

The UL signal generating section 404 generates UL signals based on commands from the UL transmission control section 403. The UL signals may include UL control signals (the PUCCH signal, the PRACH signal, etc.), UL data signals (the PUSCH signal), reference signals (the SRS, the DM-RS, etc.) and so on. Also, the UL signal generating section 404 may generate a UL-BRS when the result of UL-LBT is LBT_idle. Note that the UL signal generating section 404 can be formed with a signal generator or a signal generating circuit that is used in the technical field to which the present invention pertains.

Also, the mapping section (allocation control section) 405 controls the mapping (allocation) of UL signals based on commands from the UL transmission control section 403. To be more specific, when an LBT result output from the measurement section 401 renders a decision that a UL signal can be transmitted, the mapping section 405 allocates a UL signal. Note that the mapping section 405 can be formed with a mapping circuit or a mapper that is used in the technical field to which the present invention pertains.

Note that, although a case has been described above in which an unlicensed band cell controls whether or not DL signals can be transmitted based on LBT results, the present embodiment is by no means limited to this. For example, the present embodiment is equally applicable to cases where, depending on the result of LBT, transitions are made to other carriers by DFS (Dynamic Frequency Selection), transmission power control (TPC) is applied, and so on.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. For example, a plurality of examples described above may be combined and implemented as appropriate. Consequently, the description herein is only provided for the purpose of illustrating examples, and should by no means be construed to limit the present invention in any way.

The disclosure of Japanese Patent Application No. 2014-225677, filed on Nov. 6, 2014, including the specification, drawings and abstract, is incorporated herein by reference in its entirety.

The invention claimed is:

1. A user terminal comprising:
   a transmitter that transmits an uplink shared channel and an uplink reference signal; and
   a processor that controls uplink transmission based on a result of listening to uplink transmissions in an unlicensed band,
   wherein, when the uplink reference signal is configured to be transmitted in a predetermined period in which the uplink shared channel is transmitted, the processor controls transmission of the uplink reference signal based on a result of listening that is performed before the uplink shared channel is transmitted, and
   wherein, when the result of listening that is performed before the uplink shared channel is transmitted shows an idle state, the processor controls to transmit the uplink shared channel and the uplink reference signal that is allocated in a same predetermined period as the uplink shared channel, based on the result of listening.

2. The user terminal according to claim 1, wherein, when the uplink reference signal is configured to be transmitted in a predetermined period in which the uplink shared channel is not transmitted, the processor controls transmission of the uplink reference signal based on a result of listening that is performed in a given timing before the uplink reference signal is transmitted.

3. The user terminal according to claim 2, wherein the given timing before the uplink reference signal is transmitted is a timing immediately before the uplink reference signal is allocated or a same timing as a timing of the listening that is performed before the uplink shared channel and/or the uplink control channel are transmitted.

4. The user terminal according to claim 1, wherein, when the uplink shared channel is transmitted continuously over a plurality of predetermined periods, the processor applies the result of listening to uplink transmissions to transmission of the uplink shared channel between the plurality of predetermined periods.

5. The user terminal according to claim 1, wherein, when the uplink reference signal is configured to be transmitted in a predetermined period where the uplink shared channel is not transmitted and the uplink shared channel is transmitted in a next predetermined period, the processor controls transmission of the uplink reference signal based on the result of listening.

6. A radio base station comprising:
   a receiver that receives an uplink shared channel and an uplink reference signal transmitted from a user terminal; and
   a processor that configures transmission of the uplink reference signal for the user terminal in an unlicensed band,
   wherein, when the processor configures the uplink reference signal to be transmitted in a predetermined period in which the uplink shared channel is transmitted, the receiver performs a receiving operation assuming that the uplink shared channel and the uplink reference signal is transmitted based on a result of listening to uplink transmissions that is performed before the uplink shared channel is transmitted, and
   wherein, when the result of listening that is performed before the uplink shared channel is transmitted shows an idle state, the receiver receives the uplink shared channel and the uplink reference signal that is allocated in a same predetermined period as the uplink shared channel, based on the result of listening.

7. A radio communication method for a user terminal, the method comprising:
   transmitting an uplink shared channel and an uplink reference signal; and
   controlling uplink transmission based on a result of listening in uplink,
   wherein, when the uplink reference signal is configured to be transmitted in a predetermined period in which the uplink shared channel is transmitted, the user terminal controls transmission of the uplink reference signal based on a result of listening to uplink transmissions in an unlicensed band that is performed before the uplink shared channel is transmitted, and
   wherein, when the result of listening that is performed before the uplink shared channel is transmitted shows an idle state, controlling to transmit the uplink shared channel and the uplink reference signal that is allocated in a same predetermined period as the uplink shared channel, based on the result of listening.

* * * * *